US012646364B2

(12) United States Patent
Schmidt et al.

(10) Patent No.: US 12,646,364 B2
(45) Date of Patent: Jun. 2, 2026

(54) METHOD AND DEVICE FOR DELETING OF USER DATA IN A MOTOR VEHICLE AS WELL AS A MOTOR VEHICLE

(71) Applicant: CARIAD SE, Wolfsburg (DE)

(72) Inventors: Andreas Schmidt, Braunschweig (DE); Issam Chouraib, Bottrop (DE); Benjamin Klimpke, Nordkirchen (DE)

(73) Assignee: Cariad SE, Wolfsburg (DE)

( * ) Notice: Subject to any disclaimer, the term of this patent is extended or adjusted under 35 U.S.C. 154(b) by 212 days.

(21) Appl. No.: 18/349,065

(22) Filed: Jul. 7, 2023

(65) Prior Publication Data

US 2024/0021031 A1 Jan. 18, 2024

(30) Foreign Application Priority Data

Jul. 15, 2022 (DE) ......................... 102022117811.0

(51) Int. Cl.
*G07C 5/08* (2006.01)
*B60R 16/023* (2006.01)
(Continued)

(52) U.S. Cl.
CPC ............. *G07C 5/085* (2013.01); *G07C 5/008* (2013.01)

(58) Field of Classification Search
CPC ....... G07C 5/085; G07C 5/008; H04L 67/125; H04W 4/50; H04W 12/40; H04W 4/44; H04W 8/18; H04W 8/183; B60R 16/023
(Continued)

(56) References Cited

U.S. PATENT DOCUMENTS 10,616,713 B1 * 4/2020 Yu ........................ H04W 64/006
11,520,623 B2 * 12/2022 Bross .................... G06F 9/4881
(Continued)

FOREIGN PATENT DOCUMENTS

DE 10345746 A1 4/2005
FR 3082646 A1 12/2019
WO WO-2017131253 A1 * 8/2017 ........... G07C 5/0866

OTHER PUBLICATIONS

"SGP.22 RSP Technical Specification Version 2.2.2", available on the Internet at https://www.gsma.com/esim/resources/sgp-22-v2-2-2/, Jun. 2020 (268 pages).
(Continued)

*Primary Examiner* — Tyler D Paige
(74) *Attorney, Agent, or Firm* — Seed Intellectual Property Law Group LLP

(57) ABSTRACT

The disclosure relates to a method for deleting user data in a motor vehicle. The method includes storing user data in an eUICC chip of a communication controller that enables user access to a mobile radio network, the user profile data including setting data of a device setting performed during use of the motor vehicle by at least one user in at least one other controller different from the communication controller, and receiving a delete command for removal of the user profile data in the communication controller by a profile assistant module of the communication controller from a server computer, the profile assistant module being coupled to a data management module of the motor vehicle, executing the delete command, wherein the user access to the mobile radio network is prevented by executing the delete command, and sending a clearing command by the profile assistant module to the data management module.

15 Claims, 4 Drawing Sheets

(51) Int. Cl.
*G07C 5/00* (2006.01)
*H04L 67/125* (2022.01)
*H04W 4/50* (2018.01)

(58) Field of Classification Search
USPC .......................................................... 701/33.4
See application file for complete search history.

(56) References Cited

U.S. PATENT DOCUMENTS

| | | | |
|---|---|---|---|
| 2008/0306652 | A1 | 12/2008 | Boger et al. |
| 2014/0379169 | A1 | 12/2014 | Camacho et al. |
| 2014/0380442 | A1 | 12/2014 | Addepalli et al. |
| 2015/0120135 | A1 | 4/2015 | Lawrenson |
| 2019/0098488 | A1* | 3/2019 | Syed ..................... H04L 67/306 |
| 2019/0291719 | A1 | 9/2019 | Tiziani |
| 2019/0391800 | A1* | 12/2019 | Lin ........................... G06F 8/65 |
| 2020/0092711 | A1* | 3/2020 | Chen ..................... H04W 8/205 |
| 2020/0342377 | A1 | 10/2020 | Ha et al. |
| 2022/0153277 | A1 | 5/2022 | Vijithakumara |
| 2024/0021031 | A1* | 1/2024 | Schmidt ................ H04L 67/125 |
| 2025/0193281 | A1* | 6/2025 | Shen ....................... B60L 53/68 |

OTHER PUBLICATIONS

"eSIM White Paper—The what and how of Remote SIM Provisioning" of the GSMA organization (GSMA—Global System for Communications Association), available at the Internet address https://www.gsma.com/esim/wp-content/uploads/2018/12/esim-whitepaper.pdf, Mar. 2018 (21 pages).

* cited by examiner

METHOD AND DEVICE FOR DELETING OF USER DATA IN A MOTOR VEHICLE AS WELL AS A MOTOR VEHICLE

BACKGROUND

Technical Field

The disclosure relates to a method for deleting of user data in a motor vehicle. Such user data may be produced when a user of the motor vehicle undertakes device settings for at least one vehicle device, for example a vehicle seat or a navigation device. Other important user data are so-called user profile data for user access to a mobile radio network. Such user profile data can be stored in an eUICC chip of a communication device of the motor vehicle (eUICC—embedded Universal Integrated Circuit Card). The disclosure also relates to a device for carrying out the method, as well as a motor vehicle having such a device.

Description of the Related Art

The user profile data for a customer-specific or user-specific user access to a mobile radio network can be removed afterwards in a motor vehicle from the eUICC chip provided for this by way of a so-called local profile assistant (LPA) module with the aid of a delete command from outside the motor vehicle. The local profile assistant module LPA is defined for example in the publication "eSIM White Paper—The what and how of Remote SIM Provisioning" of the GSMA organization (GSMA—Global System for Communications Association) (eSIM White Paper of March 2018, available at the Internet address https://www.gsma.com/esim/wp-content/uploads/2018/12/esim-whitepaper.pdf).

Changing of device settings or configurations of a motor vehicle and the need for later resetting or deleting is known in particular in the context of rental vehicles.

In order to provide device settings in a centralized manner for different users with little expense it is known from US 2014/0379169 A1 how to couple a central database via a network connection to the rental vehicles, so that user-specific device settings can be downloaded to the rental vehicles from the central database. The particular user-specific data set of user data is protected against access by other users.

The outfitting of vehicles with user-specific user data via a central server is also known from US 2019/0291719 A1. As soon as it is detected that the user is no longer using the motor vehicle, the access to his user data in the motor vehicle is blocked.

It is known from DE 103 45 746 A1 that the user data of different users in a motor vehicle need to be protected against mutual access by other users. If it is known that a user is not using a motor vehicle at the moment, his user profile with the user data can be blocked.

The disclosure addresses removing user data in a motor vehicle afterwards, when the user is no longer using the motor vehicle, from outside the motor vehicle.

BRIEF SUMMARY

As one solution, the disclosure involves a method of deleting user data in a motor vehicle. The method starts from the assumption that the user data to be deleted comprise on the one hand user profile data stored in an eUICC chip of a communication controller, by which a user-specific user access to a mobile radio network is enabled in the communication controller. Thus, the user profile data constitute the access data or customer data of a user resulting for example from a mobile radio contract. The eUICC chip here is configured as an eSIM (embedded SIM; SIM—subscriber identification module) and uses the user profile data for the authentication for user access in the mobile radio network, as is known in the prior art.

It is furthermore assumed in the method that a delete command for removal of the user profile data can be received in the communication controller by a local profile assistant module, LPA, of the communication controller from a vehicle-external server computer in a manner known in the prior art. Thus, the LPA or local profile assistant module known from the prior art is available for the user profile data of the user access to the mobile radio network. The user-specific user access to the mobile radio network is not possible or it is prevented by executing said delete command, since the user profile data after executing the delete command are now absent or invalid and therefore no user-specific access information to the mobile radio network is available any longer in the communication controller or its eUICC chip.

Given these assumptions, the following is now proposed in the method for deleting of the other user data. The method assumes that the user data also comprise on the other hand setting data of at least one device setting performed during the use of the motor vehicle by at least one user in at least one other controller different from the communication controller. Thus, the method can also perform the deleting of the device settings by overwriting or resetting the user-specific device settings. For this, in order not to need any additional communication pathway besides the transmission of the delete command for the user profile data of the eUICC chip, the disclosure proposes that the local profile assistant module LPA is coupled to a data management module of the motor vehicle and a clearing command is sent out by the profile assistant module to this data management module, by which a clearing routine is triggered in the data management module, by which a respective reset command for resetting the setting data to respective user-nonspecific standard data is sent out to the at least one controller. Thus, in other words, the communication connection or the transmission possibility from outside the motor vehicle to the local profile assistant module LPA is also utilized for remote control of a data management module, in which a clearing routine is implemented or provided in order to trigger or generate a reset command in at least one controller of the motor vehicle, by which the setting data for the device settings are reset to user-nonspecific standard data. Hence, this portion of the user data, namely the setting data, is also deleted. Thus, only the communication from a server computer outside the motor vehicle to the LPA or local profile assistant module is needed in order to reach or delete or remove all user data to be deleted in the motor vehicle.

The disclosure affords the benefit that the already existing communication between server computer and LPA of the communication controller can also be utilized to reset or remove the setting data in at least one other controller, preferably in many other controllers, outside the communication controller in the motor vehicle.

The disclosure also encompasses modifications by which further benefits are produced.

A description of the already available local profile assistant module LPA is given in the publication SGP.21/22 ("eSIM Solution for Consumer Devices," SGP.22 Technical Specification v2.2.2, available on the Internet at https:// www.gsma.com/esim/resources/sgp-22-v2-2-2/): in second 1.5, the local profile assistant module LPA (including its two possible variants, LPAd and LPAe) is defined. Section 3.2.3 "Delete a Profile" shows for example the deleting of user profile data by way of the delete command "ES10c.DeleteProfile" as an example, where the user generally determines the user profile data to be deleted via the LUI component of the profile assistant module LPA. This LPA is modified with the present specification.

The mentioned vehicle-external server computer can be provided for example by the maker of the motor vehicle and it can be designed for example as a so-called backend server for functionalities of the motor vehicle. The mentioned mobile radio network can be, for example, an LTE (5G) mobile radio network for mobile telephony and mobile Internet, to mention only one example for illustration. The mentioned communication controller of the motor vehicle is also known as a communication modem, since it can be provided for the transformation of communication signals into radio signals for sending via a mobile radio transponder circuit or sending and receiving circuit to the mobile radio network. The LPA can be implemented as software or as a program module in the communication controller, in particular even in the eUICC chip, as is known in itself from the prior art. The local profile assistant module is modified in the context of the disclosure so that it establishes or operates a communication with a data management module of the controller.

The new clearing command to be implemented in this case according to one modification calls for this clearing command to be sent out by the profile assistant module in response to the delete command as a preconfigured signal. In other words, it is then sufficient to send out the delete command for the user profile data (user access) from the server computer, and the clearing command is also then generated by the profile assistant module automatically or in response to this or sent to the data management module. The user access constitutes the familiar connection to a mobile radio network, i.e., the possibility or the readiness to operate or receive telephone calls and/or Internet connections via the communication controller to the mobile radio network. Alternatively to the automated generating of the clearing command, one modification calls for the clearing command to be triggered independently of the delete command explicitly by the server computer itself in the profile assistant module. In other words, the clearing or deleting of the user profile data by way of the delete command on the one hand and the generating of the clearing command on the other hand can be triggered in the profile assistant module separately from the server computer. This affords the advantage of independent control of these two delete processes. In one variant embodiment, the command for clearing or deleting of the user profile data received from the server computer in the profile assistant module programs the (preferably delayed in time) generating or sending of the clearing command to the data management module. The time delay in the profile assistant module is only one example of the programming of the generating or sending of the clearing command; other programming based on internal or external conditions or operating states of the profile assistant module are likewise conceivable (also in combination, for example, by way of logical AND and/or OR operators).

If the clearing routine is then triggered by way of the clearing command in the data management module, according to one modification the clearing routine involves a matching up of which controller needs to be actuated for which device setting in the motor vehicle. In particular, a matching up can be done here with the aid of a look-up table LUT, in which controller the setting data for which device setting are present. The particular reset command for the setting data for the particular device setting is than sent out, addressed to the matching controller. Thus, that controller is specifically identified to which a reset command should be relayed for a particular device setting or its setting data. In particular, multiple controllers in the motor vehicle will be actuated by way of the clearing routine with a respective reset command or with multiple reset commands (for example, for the separate resetting of individual device settings). The matching up in the data management module affords the benefit that the profile assistant module does not need to implement or provide any knowledge or information as to where the particular setting data of a device setting are stored, i.e., in which controller. The selecting or addressing of the respective reset commands or the respective reset command can be implemented by way of the matching up by the data management module.

It may be advantageous not to reset or delete all at once the device settings of a user by way of the clearing routine. One modification calls for a selection of device settings to be reset from multiple predefined and selectable device settings to be made by the profile assistant module and/or by the data management module in dependence on configuration data from the server computer (which can therefore be transmitted from the server computer to the motor vehicle), and for the at least one reset command to be generated according to the selection. In other words, individual device settings for the resetting can be selected by establishing the configuration data. The rest of the device settings not selected will then remain unchanged or intact.

The communication between the server computer on the one hand and the local profile assistant module can occur in the manner known from the prior art, for example by defining a communication protocol, which defines an end to end connection between the server computer on the one hand and the local profile assistant module, LPA, on the other hand. This communication connection via such a protocol can also be encrypted, in particular, or provide for a cryptographic encipherment. A corresponding protocol for a communication with an LPA is available in the prior art.

In order to make possible an active communication from the local profile assistant module to a data management module of the motor vehicle, one can make use of a technology or a logic which is already present in the profile assistant module and is known as a so-called "proactive command." Such a "proactive command" can be generated by the profile assistant module itself in dependence on an internal operating state of the profile assistant module. On the contrary, it is also known for a local profile assistant module LPA to only recognize passive commands occurring in response to a communication with another component of the communication controller, that is, the profile assistant module is designed in itself to respond only to external commands. However, for the control of the user access a proactive command can also be provided, which is adapted to trigger a function of the communication controller. For example, in event of a run time error during the control of the user access by way of such a proactive command, a message can be put out to the user, for which the communication controller can be told or actuated by way of the proactive command to display this message. Thus, the profile assistant module itself triggers or executes or sends out the proactive command by way of the proactive command during the control of the user access. According to one modification, the profile assistant module is adapted to also provide the clearing command for the data management module as such an additional proactive command. Thus, logic already existing in the local profile assistant module for proactive commands can also be utilized to implement the method.

As already mentioned, the local profile assistant module, that is, its software, can be operated or executed in the eUICC chip itself or in a mobile radio modem of the communication controller. For this, the mobile radio modem may comprise for example a microcontroller or a microchip or a microprocessor.

The above described "proactive command," i.e., for example the automatic generating and/or putting out of a message, for example in dependence on particular conditions or the operating state of the profile assistant module LPA, can be particularly advantageous when the local profile assistant module LPA (or its software) is operated or executed in the eUICC chip itself and the automatically generated message and/or the message which is put out is relayed or sent from the eUICC chip to the communication controller and/or the data management module. Ideally, the "proactive command" will be executed in the course of a "proactive UICC session," as discussed for example in ETSI TS 102.223.

The data management module provided for the implementing of the method can likewise be implemented in the communication controller, i.e., it can be executed there as further software. Alternatively, the data management module can be designed as a distributed program module, which is operated by one part in the communication controller and by another part in a vehicle component other than the communication controller. For example, the other part being a vehicle component can utilize a controller in which a device setting has been made, or a controller different from this. As a distributed program module, the expense is less to modify a communication controller entirely for the implementing of the clearing routine, since only the part needed for the communication controller has to be implemented therein, while the other part can be provided outside the communication controller in the vehicle component. The design as a data management module which is provided entirely in the communication controller has the advantage that no additional communication is needed between the communication controller and the vehicle component. The clearing routine can then send the reset commands or the reset command directly to the at least one controller with the device setting.

The communication within the motor vehicle can occur for example through a data network, such as an Ethernet.

Once the particular reset command has been sent to the particular controller, the setting data should be reset for the at least one device setting, i.e., they should no longer be user-specific, but instead user-nonspecific setting data should be present in the particular controller. In order to verify this, one modification calls for a respective reply message regarding the performance of the respective reset command by the data management module to be received from the at least one other controller and reported to the profile assistant module. The profile assistant module then sends out a status message regarding the at least one reply message to the server computer. Thus, it can be verified from the server computer through the LPA that the user data have been successfully removed from the motor vehicle. In particular, the server computer can check whether the resetting was successful and thus whether the required device settings are in fact user-nonspecific, so that it is no longer possible to make any conclusions as to the previous user of the motor vehicle. The server computer can then send a message or a notification signal or a warning signal, depending on whether or not the resetting of all required device settings or all user data to be deleted has been confirmed by the respective reply message.

According to the present disclosure, the user data can be part of a so-called AUP (Automotive User Profile), such as is provided in connection with the "Automotive Identity" (AID) Standard of the GSMA ("AID.02 v1.0") for transmittal of user-specific data to a motor vehicle. On the other hand, according to the present disclosure the user data can also comprise in particular a so-called AUP (Automotive User Profile). This AUP can contain the setting data which are set by transmittal of the AUP to the motor vehicle in the at least one controller there, thus producing the respective device setting for the user.

Furthermore, the disclosure also includes the case when the totality of the device settings in the motor vehicle is composed of a first set of device settings undertaken by the user manually and a second set of device settings which are determined by an AUP brought into the motor vehicle from the outside. The clearing routine according to the disclosure or the reset commands according to the disclosure are not confined either to the first set of device settings or to the second set of device settings.

For application cases or application situations which might arise in the method and which are not explicitly described here, it can be provided that an error message and/or a prompt to enter a user feedback will be put out according to the method and/or a standard setting and/or a particular initial state will be established.

In order to implement the method in a motor vehicle, one can make use of a device which is likewise part of the disclosure.

As a further solution, the disclosure relates to a device for a motor vehicle, wherein the device comprises a local profile assistant module, LPA, which is adapted to deleting the user profile data stored in an eUICC chip, by which a user access to a mobile radio network is enabled in a communication controller, in dependence on a delete command received from a vehicle-external server computer to delete the user profile data. In order to also utilize this LPA to remove device settings in at least one controller of the motor vehicle other than the communication controller, the profile assistant module is adapted to sending out a clearing command to a data management module different from the profile assistant module to trigger a clearing routine for device settings. This is not provided for in the presently available standard of the local profile assistant module LPA and thus it constitutes a modification in the sense of the disclosure.

The device may comprise a data processing device or a processor device which is adapted to carry out an embodiment of the method according to the disclosure. The processor device may comprise for this at least one microprocessor and/or at least one microcontroller and/or at least one FPGA (Field Programmable Gate Array) and/or at least one DSP (Digital Signal Processor). Furthermore, the processor device may comprise program code which is adapted to carry out the embodiment of the method according to the disclosure when executed by the processor device. The program code can be saved in a data storage of the processor device. The processor circuit of the processor device may comprise, e.g., at least one circuit board and/or at least one SoC (System on Chip).

The device can be configured as the eUICC chip itself in which the LPA is implemented or as the communication controller in which the eUICC chip is arranged.

Finally, the disclosure also includes as a further solution the described motor vehicle, comprising at least one controller, which is adapted to receive or set device settings made during a use of the motor vehicle by at least one user and to store them as setting data. The motor vehicle furthermore comprises the described communication controller, which is adapted to provide a user access to a mobile radio network by way of user-specific user profile data. These user profile data are the already familiar SIM data, such as are provided in the context of a mobile radio contract for a user. The motor vehicle comprises a local profile assistant module LPA for the user profile data, in order to manage or import or remove these user profile data. Now, in order to make possible the method according to the disclosure, a data management module is provided in the motor vehicle for resetting the particular device setting of the at least one controller and the motor vehicle is adapted to carry out an embodiment of the method according to the disclosure in the described manner. The motor vehicle according to the disclosure is configured preferably as an automobile, especially a passenger car or truck, or as a passenger bus or motorcycle.

The disclosure also encompasses the combinations of the features of the described embodiments. Thus, the disclosure also encompasses realizations each having a combination of the features of several of the described embodiments, as long as the embodiments were not described as being mutually exclusive.

BRIEF DESCRIPTION OF THE SEVERAL VIEWS OF THE DRAWINGS

In the following, exemplary embodiments of the disclosure shall be described.

DETAILED DESCRIPTION

The following explained exemplary embodiments are preferred embodiments of the disclosure. In the exemplary embodiments, the described components of the embodiments each time represent individual features of the disclosure, to be viewed independently of each other, and also modifying the disclosure independently of each other. Therefore, the disclosure will also encompass other than the combinations of the features of the embodiments which are shown. Furthermore, the described embodiments can also be supplemented with other of the already described features of the disclosure.

In the figures, the same reference numbers each time denote functionally identical elements.

Figure 1:
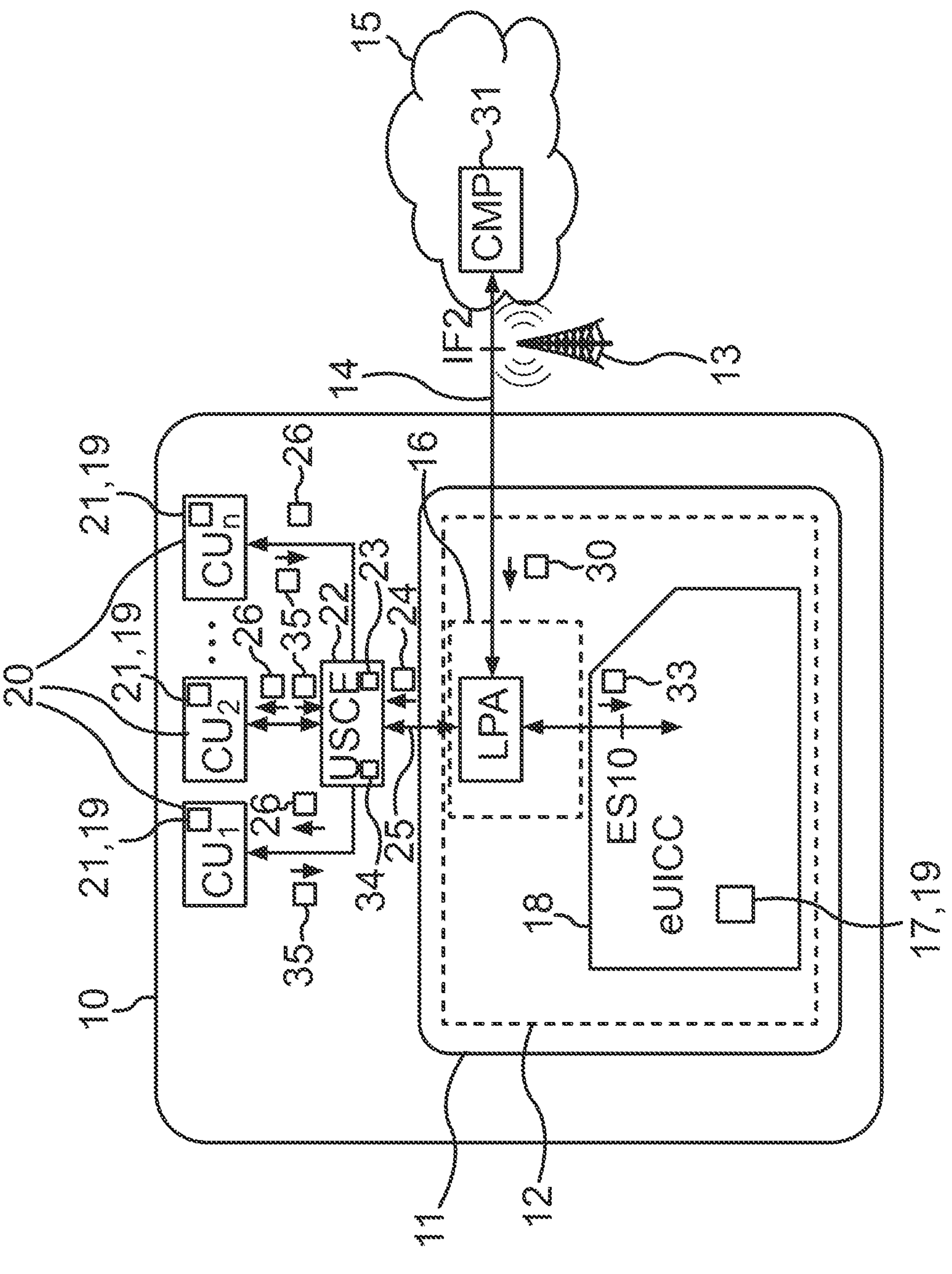
FIG. 1 shows a schematic representation of one embodiment of the motor vehicle according to the disclosure with one embodiment of the device according to the disclosure.

FIG. 1 shows a motor vehicle 10, which can be an automobile, especially a passenger car or truck. In the motor vehicle 10 there can be provided a communication controller 11, by which a mobile radio modem 12 can be realized in the motor vehicle 10. By way of the communication controller 11, a radio-based communication connection 14 for example to the Internet 15 can be provided via a mobile radio network 13. For user access to the mobile radio network 13, a local profile assistant module LPA can be provided in the communication controller 11, for example in a microprocessor 16 provided there. User profile data 17 can be provided for user access to the mobile radio network 13, which can be kept in storage in an eUICC chip 18. The user profile data 17 can be transmitted in connection with or as part of an AUP to the motor vehicle 10.

The user profile data 17 are part of user data 19 realizing a matching up or a personalization of the motor vehicle 10 for a user (not shown).

In the motor vehicle 10, furthermore, there can be provided one or more controllers 20 by which a personalization or user individualization of the motor vehicle 10 can be undertaken in the motor vehicle 10 on the basis of device settings of the controllers 20, for example device settings for adjustable seats and/or mirrors and/or navigation destinations in a navigation device and/or playback titles in a media player device or infotainment system (information entertainment system) and/or selected telephone numbers in a telephone and/or Internet addresses in an Internet browser, to mention only some examples. The respective controller 20 can keep in storage the device settings pertaining at present to the user as setting data 21, which thus likewise represent user data 19, by which the motor vehicle 10 is personalized for the user.

FIG. 1 shows how the profile assistant module LPA can exchange data or communicate with the eUICC chip 18 via the interface ES10 in the above described prior art. According to SGP.22 “RSP Technical Specification” v2.2.2, ES10 describes the interface between eUICC and LPA, in the event that the LPA is not located on the eUICC (i.e., it is consequently a LPAd, where the ending “d” refers to the implementation in the “device,” but outside the eUICC).

Furthermore, it is shown how a data management module 22 can be implemented for example in another controller in the motor vehicle 10. This data management module 22 constitutes a USCE (User Settings Control Entity), which in the event that the user does not want to make further use of the motor vehicle 10, because it is for example a returned rental vehicle, anonymizes the motor vehicle 10 or clears it of user-specific information such that it is difficult or impossible to draw any conclusions as to the user.

For this, a clearing routine 23 is provided in particular in the data management module 22, which can be activated by a clearing command 24 from the profile assistant module LPA. A vehicle-internal data connection 25 can be provided for this, which can be implemented for example on the basis of a data network provided in the motor vehicle 10, such as an Ethernet and/or a field bus, by which the controllers 20 can also be coupled to the data management module 22. The clearing routine 23 can provide that a reset command 26 is sent to the respective controllers 20, by which the setting data 21 in the particular controller 20 can be reset to standard setting data or user-nonspecific setting data or default setting data, so that it will be hard to draw any conclusions as to the user, for example his identity and/or his preferences.

The clearing command 24 can be generated by the profile assistant module LPA in connection with a delete command 30, which can be generated by a vehicle-external computer server 31, for example if the motor vehicle 10 is handed over by the user once more to a rental company and this return is detected, for example, because an employee of the rental company receives the motor vehicle 10 and therefore records the ending of the lease duration, and/or because an employee logs the motor vehicle 10 off and/or the user performs the log off.

The computer server 31 can be operated for example by a CMP (Car Mobility Provider), i.e., a rental company for motor vehicles, and the motor vehicle 10 can belong to its fleet.

For the deleting of the user profile data 17 in the eUICC chip 18, the delete command 30 can be generated and transmitted in the manner known in the prior art, for which the interface known in this context or the interface IF2 can be provided for the communication, for example.

The profile assistant module LPA can then generate the profile delete command 33 (ES10c.DeleteProfile) in the manner known in itself, for example through the interface ES10 as defined in the prior art by the GSMA, and thus instruct the eUICC chip 18 to delete the user profile data 17 in its data storage.

In addition, in dependence on the delete command 30 or independently of it, the clearing command 24 can be activated or generated by the profile assistant module LPA and transmitted to the data management module 22. In the data management module 22 there can be provided a matching instruction for a matching up 34, indicating which reset command 26 needs to be sent to which controller 20 in order to delete or overwrite the setting data 21 contained therein by resetting in the described manner.

It can be provided that reply messages 35 are received from the respective controller by the data management module 22 in order to verify a confirmation of the successful resetting. These reply messages 35 can be reported via the profile assistant module LPA and the communication connection 14 to the computer server 31, so that it can be verified in the computer server 31 whether all user data 19 in the motor vehicle 10 or all user data 19 to be deleted have been successfully overwritten or removed, so that the motor vehicle 10 can no longer be connected to the user by the user data 19 to be deleted, or information about the user has been removed.

FIG. 1 illustrates how the data management module 22 can be implemented outside the communication controller 11, for example, in the described additional or further controller or in a central computer of the motor vehicle 10.

Figure 2:
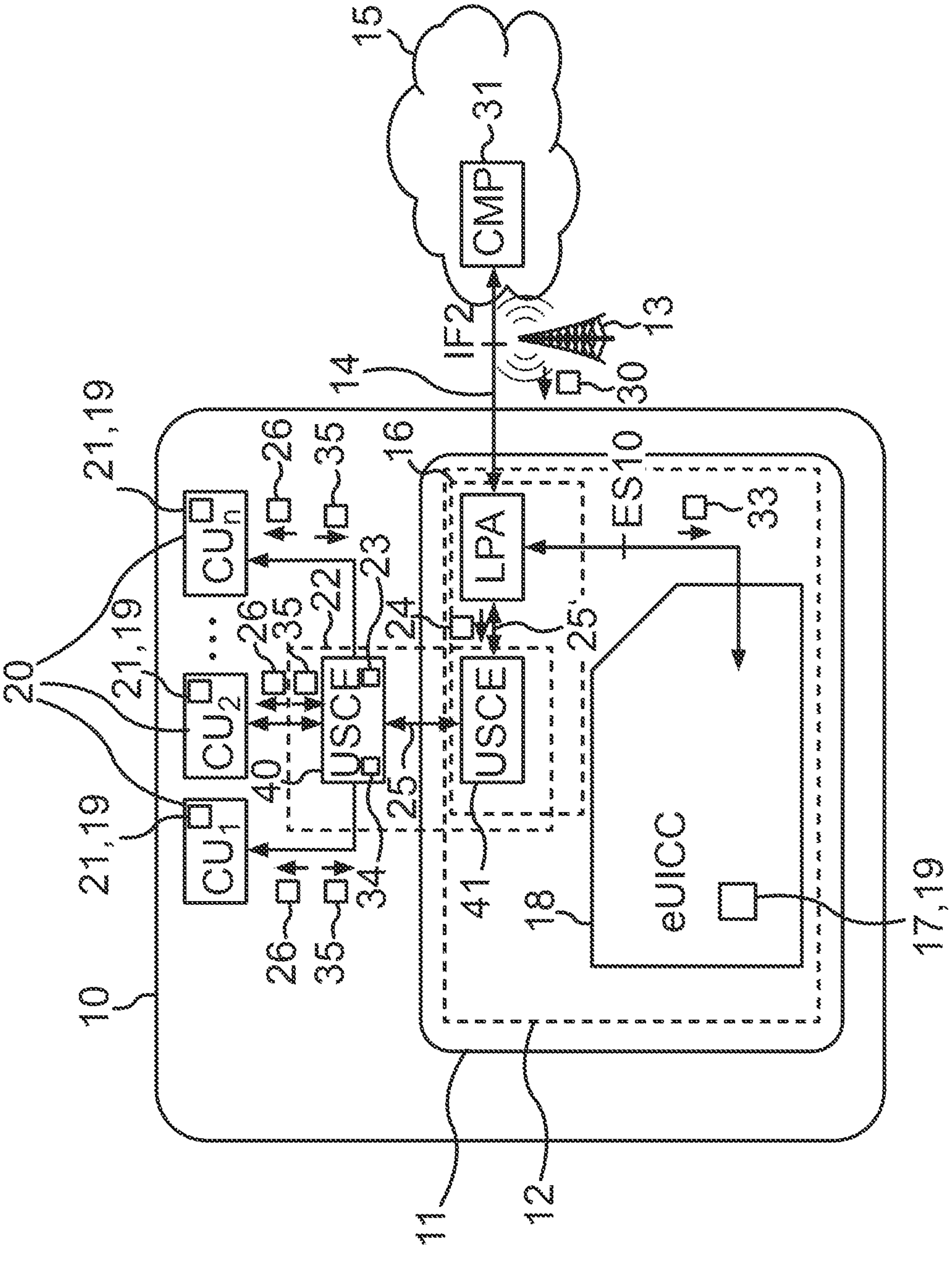
FIG. 2 shows a schematic representation of one embodiment of the motor vehicle in which a distributed program module is provided in order to implement a data management module.

FIG. 2 illustrates another implementation. The data management module 22 can be realized by two separate program modules 40, 41, of which the program module 41 can be provided in the communication controller 11 itself, for example as a program module 41 of the described microprocessor 16, which can also implement the profile assistant module LPA. Then the clearing command 24 need only be transmitted within the communication controller 11 by a corresponding data connection 25', which can be implemented for example as an interprocess communication (IPC) or as a function call within the microprocessor 16. The data connection 25 can then be utilized between the program modules 40, 41. Hence, the LPA itself need not be expanded in order to control the data connection 25 itself.

Figure 3:
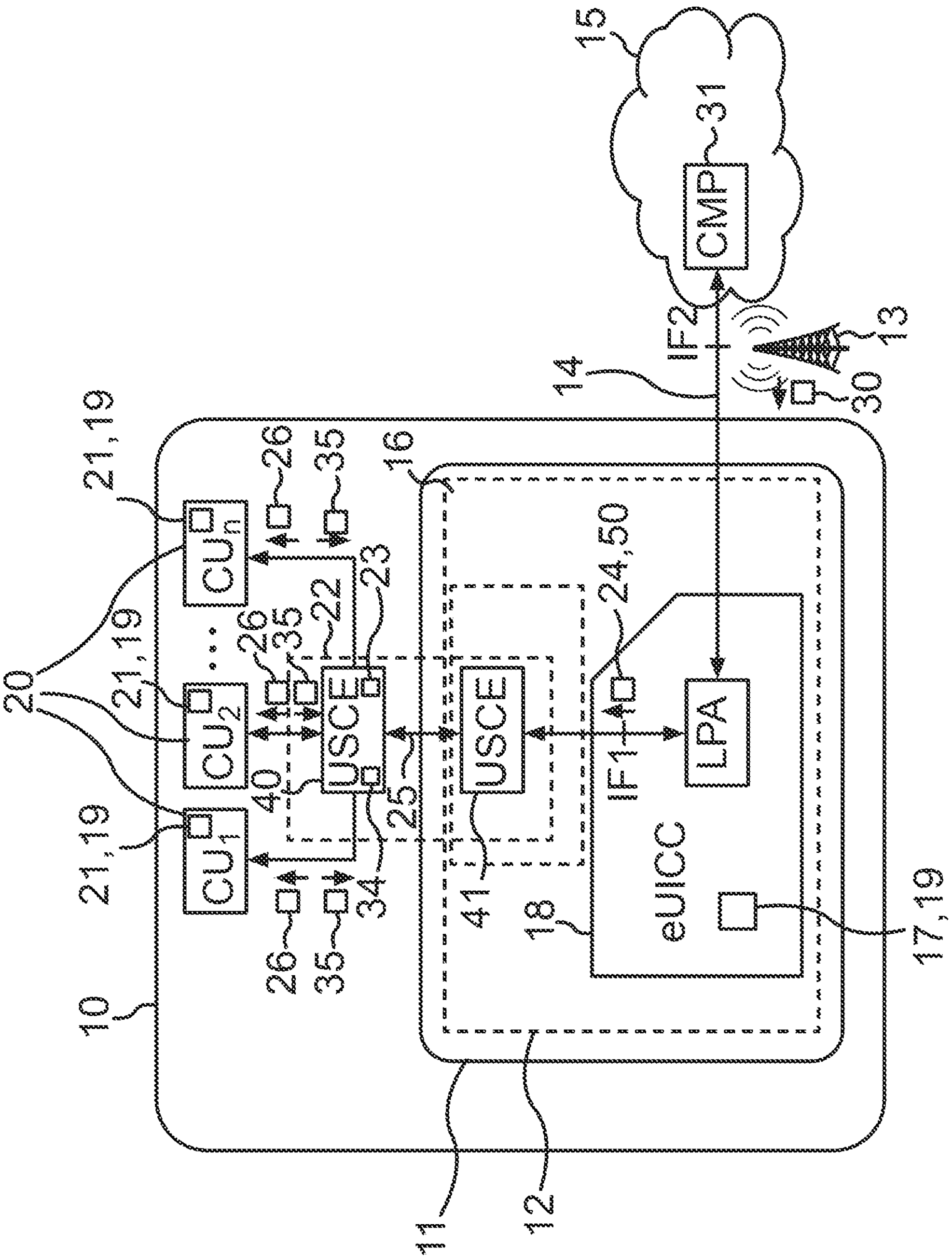
FIG. 3 shows a schematic representation of the motor vehicle in which a local profile assistant module LPA is implemented in an eUICC chip.

FIG. 3 illustrates a further implementation on the basis of the embodiment of FIG. 2 (the embodiment of FIG. 1 is also possible). The profile assistant module LPA can also be integrated in the eUICC chip 18.

A communication between the profile assistant module LPA and the data management module 22 can occur for example via the interface or the interface IF1, which is known from the prior art in connection with the communication with an eUICC. The communication connection 14 can be used for this to transmit the delete command 30 also to the profile assistant module LPA in the eUICC chip 18 via the IF2, making use of the protocol provided for this for an end to end connection to the profile assistant module LPA. Hence, starting from the profile assistant module LPA, the user profile data 17 can be deleted in the eUICC chip 18. The clearing command 24 can be sent out to the data management module 22 from the eUICC chip 18, for example as a so-called proactive command 50, via the IF1.

Figure 4:
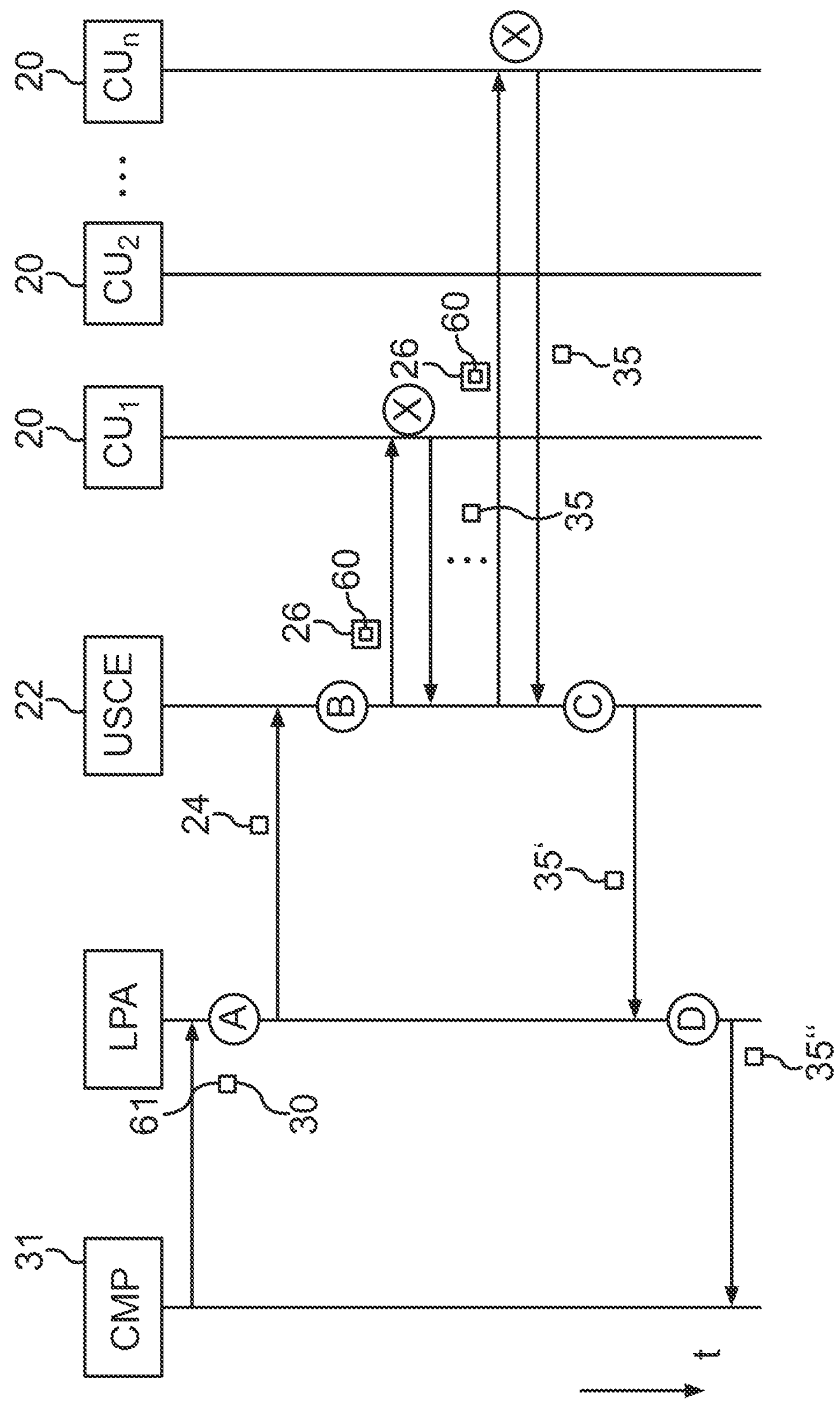
FIG. 4 shows a message sequence chart (MSC) to illustrate one embodiment of the method according to the disclosure.

FIG. 4 illustrates one possible sequence for deleting of user data 19 in the motor vehicle 10.

The described messages or commands can be generated or exchanged over the time t. For example, the computer server 31 after recognizing a return of the motor vehicle 10 by the user, for example to a rental company for the motor vehicle 10, can generate the delete command 30, which can activate in the profile assistant module LPA the sending of the clearing command 24 to the data management module 22. The data management module 22 can ascertain, in the manner described, which controller 20 should be ordered to reset or delete the setting data 21 by sending a corresponding reset command 26 for this.

Parameters 60 in the reset command 26 can be used to control which device setting needs to be reset or made unrecognizable. The parameters 60 can be set for example in dependence on configuration data 61, which can be relayed for example with the delete command 30 from the computer server 31. The delete command 30 can be limited to only generate the clearing command 24 or in addition it can also initiate the deleting of the user profile data 17 in the eUICC chip 18 in the described manner.

The reply messages 35 from the controllers 20 can be collected for example by the data management module 22 and upon receiving all reply messages 35 for the particular reset command 26 a reply message 35' can be relayed from the data management module 22 to the profile assistant module LPA, which can then report the receiving of this reply message 35' as a delete confirm message 35" to the computer server 31, so that it is known in the computer server 31, or information is present there, as to whether all controllers 20 have reset or deleted the setting data 21 stored in them.

After this, for example, a release can be reported in the computer server 31, by which the user can be released for example from the rental process for the motor vehicle 10 or the rental process can be terminated.

In the following, yet another embodiment shall be described.

The GSMA (www.gsma.com) is currently involved in defining an "Automotive Identity" (AID—vehicle identity). It has begun drafting the technical specification AID.02 ("Automotive Identity Technical Description"), in which the interface between a Mobile Service Provider (MSP) and a Car Mobility Provider (CMP) is described as part of the AID framework. A Mobile Service Provider (MSP) is a provider of mobile communication services, such as a Mobile Network Operator (MNO) or Mobile Virtual Network Operator (MVNO), which has a mobile radio subscription (i.e., a commercial relationship for provisioning of wireless services, e.g., according to the 3GPP specifications, the 2G-GSM/3G-UMTS/4G-LTE/5G-NR or some other radio access technology) with a customer. A Car Mobility Provider (CMP) can be, e.g., an auto maker (with one or more models), a rental car company, a fleet management company.

In connection with the personalization of the AID, i.e., its adapting to the given vehicle user, e.g., the owner or primary user, the AID user profile (AUP) has been defined. This is a single profile encompassing data on content services and vehicle services, as well as MSP-specific data (i.e., mobile radio subscriber data plus (optionally) meta data such as an MSP name, a symbol, etc., for display through the human/machine interface of the vehicle), which are downloaded into a vehicle in order to personalize this vehicle for the particular user. One can imagine the AID user profile (AUD) as being a kind of "umbrella profile," which reconciles the data of the mobile radio contract with the individual user preferences and definite service settings. The actual method of downloading of the mobile radio subscriber data of a user is based on the proven mechanisms of Remote SIM Provisioning (RSP), which are described in SGP.21/22 (generally known as "Remote eSIM Provisioning Solution for Consumer Devices").

The current discussions at the GSMA leave all details open as to the content and vehicle services, which can be part of the above-described overarching AID user profile. However, it should be assumed that the data pertaining to these services may in future involve at least one individual configuration or user preference.

Even if this expectation does not come true and individual configurations or user preferences are not (or only partially) part of the overarching AID user profile, the user can still manually configure a multitude of settings at his individual will. Anyone who has used a modern automobile with a digital cockpit knows how many possibilities there are today for configuring the manner in which, for example, maps are represented for navigation purposes: color schemes, day or night mode, size/position on the display in relation to other information which needs to be indicated, the user can choose among different map types (topological, topographic, satellite, etc.), superpositioning of points of interest, and much more.

The subject of the present idea is the "deleting of an operational profile," as is described in Section 4.4 of "AID.02 v1.0."

This process is as follows:

1) Start conditions
   - The user is received in the AID service (login data present).
   - The user has at least one vehicle which is provided for the AID service.
2) Procedure
   - [1] The user logs in at the CMP touchpoint (e.g., an Internet portal).
   - [2] The user would like to delete a particular operational profile (i.e., his user data) for a particular vehicle. The touchpoint shows the vehicles for which profiles have been downloaded, and allows the user to make a selection of one of these vehicles.
   - [3] A request to delete the operational profile is sent to the CMP backend, including the vehicle identification.
   - [4] An order to delete the operational profile is sent from the CMP backend/server computer to the respective vehicle.
   - [5] The operational profile (user profile data) is deleted from the eUICC of the vehicle.
   - [6] A delete message can be sent to the SM-DP+ platform of the MSP. The messaging is defined in the technical specification GSMA SGP.22 RSP.
   - [7] A delete message can be sent to the CMP backend.
   - [8] Optionally, a further delete message can be sent from the CMP backend to the MSP backend.
3) End state
   - The operational profile is deleted from the vehicle.
   - The CMP backend is informed as to the deleting of the operational profile.
   - The MSP backend is informed as to the deleting of the operational profile.
   - The MSP SM-DP+ platform is informed as to the deleting of the operational profile.

It is proposed to modify the "Deletion of an Operational Profile" procedure of "AID.02 v1.0" such that an incoming "Request Delete OP" from the CMP backend server/server computer (see step 4) also initiates a reset of the individual user configurations and/or preferences (i.e., device settings/setting data) (regardless of whether or not they are part of the AUP).

As already mentioned, the Car Mobility Provider (CMP) may be a car rental, a fleet management company, a ride-sharing company, an auto maker, a company operating multiple vehicles, and so forth. The new functionality which we are proposing would be especially advantageous when the CMP is a car rental and when the user returns his automobile at the end of the lease. According to the idea, not only is the operational profile of the user (data of the mobile radio contract, also called the user profile data above) deleted from the respective vehicle, but also the CMP (in this case, the car rental) can remove all digital remnants of the preceding lease period. Namely, the CMP is able to prepare the vehicle "electronically" for the next customer by resetting at least one of the individual configurations and/or user preferences to the standard settings (by deleting data traces saved in various storage locations which are distributed among different subsystems of the vehicle).

This helps ensure the privacy of the earlier customer (e.g., way points and routes are deleted from the history of the navigation system or telephone numbers of recently made or received calls are deleted from the telephony application of the vehicle).

No employees need to manually operate the infotainment system of the returned vehicles at the end of the lease, click through the menu, and make sure that all data of the previous customer have been deleted.

The LPA is used advantageously for this. The SIM provisioning method according to SGP.21/22 (also known as the "eSIM Solution for Consumer Devices") defines a functional element of the Local Profile Assistant (LPA), which can be located either in the device (in our case: in the Onboard Connectivity Unit of the vehicle) or in the eUICC. It offers three functions, namely:

- Download local profile (LPD),
- Local discovery services (LOS), and
- Local user interface (LUI).

When the LPA is located in the communication device, the elements/features can be designated as LPAd, LPDd, LUId, LDSd. If the LPA is located in the eUICC, they can be designated as LPAe, LPDe, LUIe, LDSe.

In old systems (Smartphones etc.) the user interacts with the LPA (more precisely: with the LUI of the LPA) via the Eseu interface, which does not come under the application range of SGP.22. In the AID framework, the CMP communicates with the LPA precisely through this interface, in order to initiate profile management operations such as downloads or deletions of profiles. This interface between CMP and LPA can also be somewhat modified in the AID framework, so that in the further presentation of the idea we shall speak of the interface IF2. The "Request Delete OP" coming from the CMP backend (see step 4 in FIG. 2), which we are proposing for the idea, will therefore also be received by the LPA via the Eseu interface (or via IF2). "AID.02 v1.O" defines HTTP messages and HTTP status codes which can be used in connection with the AID framework, preferably in combination with Transport Layer Security (TLS).

According to a first aspect of the idea, we propose using the message "Request Delete OP," such as is currently defined, to also activate a resetting of individual user configurations and/or settings (regardless of whether or not they are part of the AUP).

According to a second aspect of the idea, we propose expanding the message "Request Delete OP" with steering commands to enable a finer granularity for the activation of a resetting of selected individual user configurations and/order preferences (regardless of whether or not they are part of the AUP). Specifically, we propose including steering commands pertaining to at least one of the following parameters in the "Request Delete OP" message:

- Settings of the seat position
- Settings of the seat heating
- Settings for the steering wheel positioning
- Settings of the steering wheel heating
- Settings for the driver assist functions
- Mirror/camera settings
- Settings for the air conditioning system
- Settings in regard to APPs (including details on individual accounts), for example in the categories
  - messaging
  - audio/video streaming
  - office
- settings for the ambient lighting (ambient lighting in the vehicle interior)
  - color or color scheme
  - intensity
- digital cockpit configurations
  - display options
    - which information is displayed and where?
    - arrangement of the icons
  - language preferences
  - preferred themes
- settings of the navigation system
  - routes often used by the user
  - individual points of interest (POIs)
- multimedia preferences
  - loudness (per service)
  - storage sequence of the preferred radio channels
  - arrangement/order of the displayed APPs Upon receiving the message "Request Delete OP", all settings (see the first aspect) or only the explicitly mentioned settings in the vehicle (see the second aspect) will be reset to the standard values (or values determined by the CMP).

This is made possible by the third aspect of the idea: it may happen that various controllers/control units CU1 . . . CUn (see the figures) need to be addressed in order to reset the individual user configurations and/or preferences in different control ranges. Thus, for example, the settings for the air conditioning system are controlled by a different control unit than the control unit for the ambient lighting. Therefore, the corresponding controllers in the vehicle will be informed by a User Settings Control Entity (USCE—data management module) as to the additional steering commands/delete command received from the CMP/server computer.

In one embodiment, the USCE is the LPA or it can comprise this, in another embodiment the USCE is connected to the LPA. In a further embodiment, the USCE is located in the vehicle (USCEv), in another embodiment the USCE is located in the device (USCEo). In another embodiment, the USCE consists of two parts (USCEv and USCEo), which are located both in the vehicle and in the device.

The interfaces can be realized as proprietary interfaces between the participating functional units LPAd/USCE/CUx or LPAd/USCEo/USCEv/CUx, while alternatively at least the IF1 interface (between the eUICC and the device) can be standardized in order to make possible the exchanging of messages between the LPAe and the USCEo. In all exemplary usage scenarios represented in the figures, the message "Request Delete OP," which contains the control commands provided for the clearing according to the idea, is received via the IF2 interface from the CMP. Reply messages (if configured) will likewise be transmitted via the IF2 interface from the LPA back to the CMP.

In regard to the IF1 interface, a distinction is preferably made between "normal commands" and "proactive commands" in the SIM/UICC specifications for the communication between the device/terminal (in our case: the Onboard Connectivity Unit of the vehicle) and the eUICC. The first kind of commands (e.g., RUN GSM ALGORITHM) is put out by the device/terminal, while the second kind of commands is put out by the eUICC (e.g., DISPLAY TEXT). The "proactive commands" utilize certain "normal commands" like FETCH/TERMINAL RESPONSE/ENVELOPE as communication channels together with special status words which are used in the reply APDU of the "normal commands" (e.g., "91xx" means "proactive command pending"). Further details about proactive UICC sessions are defined in ETSI TS 102.223.

Consequently, in the context of the present idea (see FIG. 3) it is proposed as a fourth aspect of the idea to define a new proactive eUICC action for the routing of the control commands proposed according to the idea in order to initiate a resetting of selected individual user configurations and/or preferences (regardless of whether or not they are part of the AUP) via the IF1 interface from the eUICC to the device/terminal device. The corresponding proactive command could be called for example "DELETE AUP-PROFILE." Alternatively, the proactive command "SEND DATA" could also be reused. In both instances, it must be clear that the communication channel to be used via the IF1 interface is organized between the LPA (in the eUICC) and the USCE (in the device).

Note: if the CMP is a car rental and the message "Request Delete OP" is relayed by the customer at the end of the least during the return of the vehicle, the reset method proposed according to the idea may contain individual user configurations and/or settings which are not part of the AUP.

The message flow chart shows the coupling of the deleting of subscriber data of a user (=Operational SIM Profile, also called the user profile data above) to the deleting of individual vehicle configuration settings and/or preferences. Furthermore, it is assumed that the CMP is a car rental and that the Operational SIM Profile is coordinated with a customer of this car rental, who has brought along with him his personal subscription (data plan) for the duration of the lease in the rental car. For marketing reasons, the car rental makes use of a particular logo and a green/white color scheme.

At the end of the lease, the car rental decides not only to remove the subscriber data of the customer (=Operational SIM Profile, also called the user profile data above) from the vehicle in order to free up storage space for the next customer, but also to initiate a reset of the navigation system of the vehicle (for data protection reasons) and the ambient lighting of the vehicle (for marketing reasons). Thus, the "Request Delete OP" message sent by the CMP on the infrastructure side and received by the Local Profile Assistant (LPA) in the vehicle will be expanded with two additional control commands:

a) all personal data (e.g., routes traveled, special destinations, search results, etc.) should be deleted from the navigation system of the vehicle.

b) the ambient lighting of the rental car should be set at the preferred or standard color scheme of the car rental agency.

In one embodiment, the "Request Delete OP" message is realized in the form of a HTTP message, as is proposed in "AID.02 v1.0" for similar messages in connection with the AID framework.

For the following steps of the process, we refer once more to FIG. 4.

At point "A," the LPA initiates the deleting of the subscriber data of the customer (=Operational SIM Profile) from the eUICC. The LPA also recognizes the control commands proposed according to the idea, which are contained in the message "Request Delete OP," and it generates a message "User Setting Delete Request," which is relayed to the User Setting Control Entity (USCE). This message likewise contains the two additional control commands. The USCE can—in one embodiment of the present idea—consist of two subfunctions (USCEo and USCEv, as described above).

At point "B," the USCE recognizes the additional steering commands which are contained in the message "User Setting Delete Request" and finds out from them which of the control units (CUs) are relevant for the given steering commands. In this example, the relevant CUs are the control unit for the navigation system (e.g., CU1 in FIG. 4) and the control unit for the ambient lighting (e.g., CUn in FIG. 4).

In another embodiment of the present idea, the messages "Request Delete OP" and "User Setting Delete Request" only contain a new information element ("flag"), according to the idea, which is used to indicate that "CMP requests a complete resetting to the standard values in all controllers."

The various CUs which have been instructed by the USCE to delete the individual configurations and/or preferences of the user by way of a "Delete Request" message can respond with a "Delete Response" message to the USCE in order to report the successful or unsuccessful execution of the reset process in their respective purview.

At point "C," the USCE evaluates the response messages received from the various CUs and creates a "User Setting Delete Response" message, which is relayed to the LPA. This step is optional and only necessary if the LPA has asked for a confirmation.

At point "D," the LPA evaluates the return message received from the USCE and creates a "Response Delete OP" message, which is relayed back to the CMP. This step is optional and only necessary if the CMP has asked for a confirmation. In one embodiment, the return message is realized as a HTTP status code, as proposed in "AID.02 v1.0" for similar messages in connection with the AID framework.

At the points "X" indicated in FIG. 4, the individual user configurations and/or service preferences are deleted on the basis of the parameters contained in the various entities of the "Delete Request" message. In our example, the control unit for the navigation system (CU1 in the diagram) carries out the deleting of all personal user data (such as routes traveled, points of Interest, search results) from the navigation system of the vehicle, and the control unit for the ambient lighting (CUn in the diagram) sets the ambient lighting of the rental car back to the color scheme preferred or preset by the rental car company.

With these automated actions, all digital traces of the previous rental car customer are deleted quickly and reliably from the vehicle, without one having to move manually through the menus of the different functional units.

The prior art in general does not refer to eSIM/eUICC remote provisioning techniques, while the present idea is based on eSIM/eUICC remote provisioning techniques.

There is one technical hurdle to be overcome in the eSIM/eUICC remote provisioning scenarios: the delete command described here is addressed to the eUICC (since it is connected with a SIM profile management command). It is not apparent how the control information portions pertaining to the (deleting of) various individual user settings will be extracted from the SIM profile management command and how these will be processed and handed over to the User Settings Control Entity (USCE). For this, see the fourth aspect of the idea, where we describe a new proactive eUICC command for this purpose.

In the following, further advantageous aspects are pointed out:

1) Method for remote deleting of data pertaining to at least one of the individual vehicle configuration settings of a user and to individual user service preferences.

2) Method according to aspect 1, characterized in that the deleting is performed in the AID framework as defined by the GSMA.

3) Method according to aspect 1, characterized in that the deleting is coupled to the deleting of the individual subscriber data (also called the user profile data above) of a user of an embedded UICC.

4) Method according to aspect 1, characterized in that the data to be deleted have been previously configured by way of an AID user profile (AUP) of a user.

5) Method according to aspect 1, characterized in that the data to be deleted are independent of the AID user profile (AUP) of the user.

6) Method according to aspect 1, characterized in that the data to be deleted are stored in various different functional units which are distributed over the entire vehicle system architecture.

7) Method according to aspect 6, characterized in that the individual functional units enable the control of at least one of the following functions: seat positioning, seat heating, steering wheel positioning, steering wheel heating, drive assist functions, mirrors, cameras, air conditioning system, ambient lighting, digital cockpit, display, navigation system, multimedia, etc.

8) Method according to aspect 2, characterized in that a remote command for the deleting of data is initiated by a Car Mobility Provider (CMP).

9) Method according to aspect 8, characterized in that the CMP is at least one of the following units: a car rental agency/a fleet management company/a ride-sharing company/an auto maker/a company operating multiple vehicles.

10) Method according to aspect 8, characterized in that the remote command for the deleting of data is received, analyzed and/or processed in a functional unit which is located in the Onboard Connectivity Unit (OCU) of a vehicle.

11) Method according to aspect 9, characterized in that the remote command for the deleting of data is relayed to different relevant functional units which are distributed in the entire vehicle.

12) An Onboard Connectivity Unit (OCU) working according to one of the above described methods.

13) An embedded UICC (eUICC), working according to the above described method.

14) An infrastructure component (server), working according to the above described method.

15) A vehicle control and management system, working according to the above described method.

On the whole, the examples show how a deleting of individual user settings (user data) can be provided, e.g., in the AID context.

German patent application no. 102022117811.0, filed Jul. 15, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for deleting of user data in a motor vehicle, the method comprising:

storing user profile data in an embedded Universal Integrated Circuit Card (eUICC) chip of a communication controller that enables a user-specific user access to a mobile radio network, wherein the user profile data includes setting data of a plurality of device settings performed during use of the motor vehicle by at least one user in a plurality of other controllers different from the communication controller, and wherein the plurality of other controllers includes at least two of: a controller of a navigation system, a controller of an adjustable seat, a controller of a steering wheel, a controller of a driver assist system, a controller of an air conditioning system, a controller of an adjustable mirror, a controller of a digital cockpit system, a controller of an ambient lighting system, or a controller of a media player device;

receiving a delete command for removal of the user profile data in the communication controller by a profile assistant module of the communication controller from a vehicle-external server computer, wherein the profile assistant module of the communication controller is coupled to a data management module of the motor vehicle that is different from the communication controller;

executing the delete command, by the communication controller, wherein the user access to the mobile radio network is prevented by the executing of the delete command; and sending a clearing command by the profile assistant module of the communication controller to the data management module of the motor vehicle that is different from the communication controller, wherein the clearing command triggers a clearing routine in the data management module of the motor vehicle, wherein the clearing routine in the data management module includes sending from the data management module to the plurality of other controllers different from the data management module a plurality of reset commands that cause the plurality of other controllers different from the data management module to reset the setting data to user-nonspecific standard data for resetting of the plurality of device settings, wherein the plurality of reset commands include at least a first reset command that causes first setting data to be reset, and a second reset command that causes second setting data to be reset, wherein the first reset command is sent to an address of a first other controller of the plurality of other controllers, and the second reset command is sent to an address of a second other controller of the plurality of other controllers, and wherein the data management module determines the address of the first other controller, the first setting data, the address of the second other controller, and the second setting data by matching configuration data sent from the server computer with data included in a table stored by the data management module.

2. The method according to claim 1, further comprising:

sending the clearing command by the profile assistant module in response to the delete command, or independently of the delete command in response to a trigger from the server computer.

3. The method according to claim 1, wherein the clearing routine includes determining a matching controller to be actuated for the plurality of device settings in the motor vehicle, and wherein the plurality of reset commands for the plurality of device settings is addressed to the matching controller.

4. The method according to claim 1, further comprising:

selecting a plurality of device settings to be reset from multiple predefined and selectable device settings by the profile assistant module or by the data management module based on the configuration data from the server computer, wherein the reset commands are generated according to the device settings to be reset.

5. The method according to claim 1, wherein the profile assistant module is implemented in the eUICC chip or in a mobile radio modem of the communication controller.

6. The method according to claim 1, wherein the profile assistant module is implemented in the eUICC chip, and wherein the profile assistant module sends the clearing command based on an internal operating state of the profile assistant module.

7. The method according to claim 1, wherein the data management module is included in the communication controller or is a distributed program module having a first part in the communication controller and a second part in a vehicle component different from the communication controller.

8. The method according to claim 1, further comprising:

receiving a plurality of reply messages regarding performance of the reset commands by the data management module from the plurality of other controllers;

reporting the reply messages to the profile assistant module; and sending a status message regarding the reply messages from the profile assistant module to the server computer.

9. The method according to claim 1, wherein the user data are part of an Automotive User Profile, AUP, of an Automotive Identity, AID, or wherein the user data includes an AUP of the AID together with other non-AUP user data.

10. The method according to claim 1, wherein the setting data include at least one of: a route stored by the navigation system, a point of interest stored by the navigation system, a setting of a seat position of the adjustable seat, a setting of heating of the adjustable seat, a setting of positioning of the steering wheel, a setting of heating of the steering wheel, a setting of a driver assist function of the driver assist system, a setting of the air conditioning system, a setting of the adjustable mirror, a setting of information displayed by the digital cockpit system, a color scheme of the ambient lighting system, an intensity of the ambient lighting system, a loudness setting of the media player device, a preferred radio channel of the media player device, or an arrangement of applications displayed by the media player device.

11. A device for a motor vehicle, the device comprising:
a processor; and
a memory storing instructions that, when executed by the processor, cause the device to:
delete user profile data stored in an embedded Universal Integrated Circuit Card (eUICC) chip and, based on a delete command to delete the user profile data received from a vehicle-external server computer, wherein a user access to a mobile radio network is enabled in a communication controller, and
send a clearing command that triggers a clearing routine for a plurality of device settings,
wherein the user profile data includes setting data of the plurality of device settings performed during use of the motor vehicle by at least one user in a plurality of other controllers different from the communication controller,
wherein the plurality of other controllers includes at least one two of: a controller of a navigation system, a controller of an adjustable seat, a controller of a steering wheel, a controller of a driver assist system, a controller of an air conditioning system, a controller of an adjustable mirror, a controller of a digital cockpit system, a controller of an ambient lighting system, or a controller of a media player device,
wherein the clearing routine includes sending to the plurality of other controllers a plurality of reset commands that cause the plurality of other controllers to reset the setting data to user-nonspecific standard data for resetting of the plurality of device settings,
wherein the plurality of reset commands include at least a first reset command that causes first setting data to be reset, and a second reset command that causes second setting data to be reset,
wherein the first reset command is sent to an address of a first other controller of the plurality of other controllers, and the second reset command is sent to an address of a second other controller of the plurality of other controllers, and
wherein the address of the first other controller, the first setting data, the address of the second other controller, and the second setting data are determined by matching configuration data sent from the server computer with data included in a table stored in the memory.

12. The device according to claim 11, wherein the device is implemented in the eUICC chip or the communication controller.

13. The device according to claim 11, wherein the setting data include at least one of: a route stored by the navigation system, a point of interest stored by the navigation system, a setting of a seat position of the adjustable seat, a setting of heating of the adjustable seat, a setting of positioning of the steering wheel, a setting of heating of the steering wheel, a setting of a driver assist function of the driver assist system, a setting of the air conditioning system, a setting of the adjustable mirror, a setting of information displayed by the digital cockpit system, a color scheme of the ambient lighting system, an intensity of the ambient lighting system, a loudness setting of the media player device, a preferred radio channel of the media player device, or an arrangement of applications displayed by the media player device.

14. A motor vehicle comprising:
a plurality of other controllers which, in operation, receives a plurality of device settings made during a use of the motor vehicle by at least one user and stores the device settings as setting data; and
a communication controller different from the plurality of other controllers,
wherein the communication controller, in operation, provides a user access to a mobile radio network by way of user profile data, wherein the communication controller includes an embedded Universal Integrated Circuit Card (eUICC) chip that stores user profile data including the setting data,
wherein the user profile data includes setting data of the plurality of device settings performed during use of the motor vehicle by at least one user in the plurality of other controllers different from the communication controller,
wherein the plurality of other controllers includes at least two of: a controller of a navigation system, a controller of an adjustable seat, a controller of a steering wheel, a controller of a driver assist system, a controller of an air conditioning system, a controller of an adjustable mirror, a controller of a digital cockpit system, a controller of an ambient lighting system, or a controller of a media player device, and
wherein the communication controller includes a profile assistant module which, in operation, receives a delete command for removal of the user profile data from a vehicle-external server computer, and executes the delete command, wherein the user access to the mobile radio network is prevented by execution of the delete command; and
a data management module coupled to the profile assistant module, wherein the data management module, in operation, receives a clearing command from the profile assistant module, and performs a clearing routine in which a plurality of reset command that reset the setting data to user-nonspecific standard data for resetting of the plurality of device settings is sent to the plurality of other controllers,
wherein the clearing routine includes sending to the plurality of other controllers a plurality of reset commands that cause the plurality of other controllers to reset the setting data to user-nonspecific standard data for resetting of the plurality of device settings,
wherein the plurality of reset commands include at least a first reset command that causes first setting data to be reset, and a second reset command that causes second setting data to be reset,
wherein the first reset command is sent to an address of a first other controller of the plurality of other controllers, and the second reset command is sent to an address of a second other controller of the plurality of other controllers, and
wherein the address of the first other controller, the first setting data, the address of the second other controller, and the second setting data are determined by matching configuration data sent from the server computer with data included in a stored table.

15. The motor vehicle according to claim 14, wherein the setting data include at least one of: a route stored by the navigation system, a point of interest stored by the navigation system, a setting of a seat position of the adjustable seat, a setting of heating of the adjustable seat, a setting of positioning of the steering wheel, a setting of heating of the steering wheel, a setting of a driver assist function of the driver assist system, a setting of the air conditioning system, a setting of the adjustable mirror, a setting of information displayed by the digital cockpit system, a color scheme of the ambient lighting system, an intensity of the ambient lighting system, a loudness setting of the media player device, a preferred radio channel of the media player device, or an arrangement of applications displayed by the media player device.

* * * * *